Aug. 12, 1969     A. A. MOORE ET AL     3,460,704
PORTABLE SURFACE-ERECTED STORAGE CONTAINER
FOR LIQUID AND DRY MATERIALS
Filed July 31, 1967     3 Sheets-Sheet 3
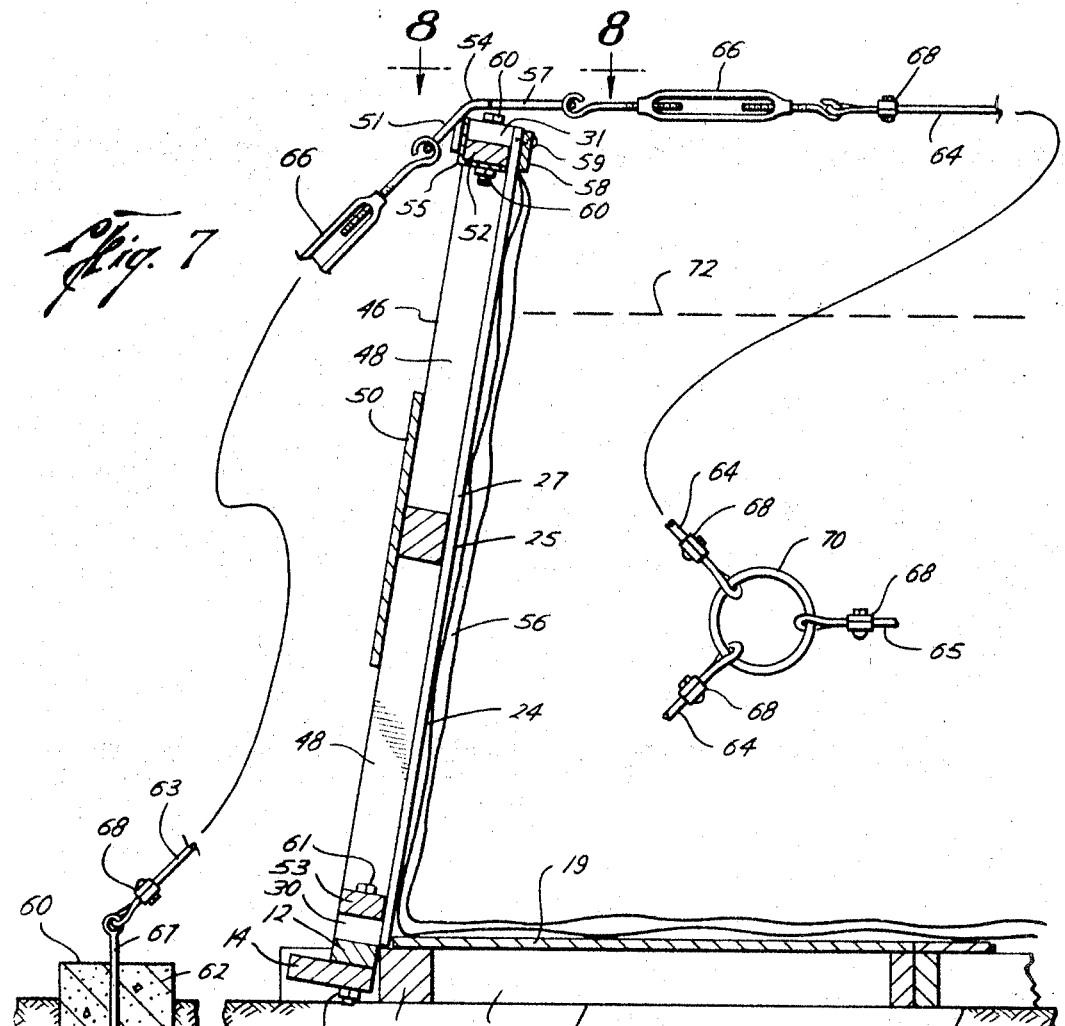
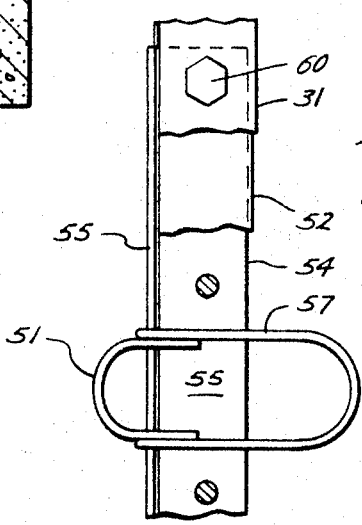
Alvan A. Moore
David L. Washington
INVENTORS
BY Arnold, Roylance,
Kruger & Durkee.
ATTORNEYS

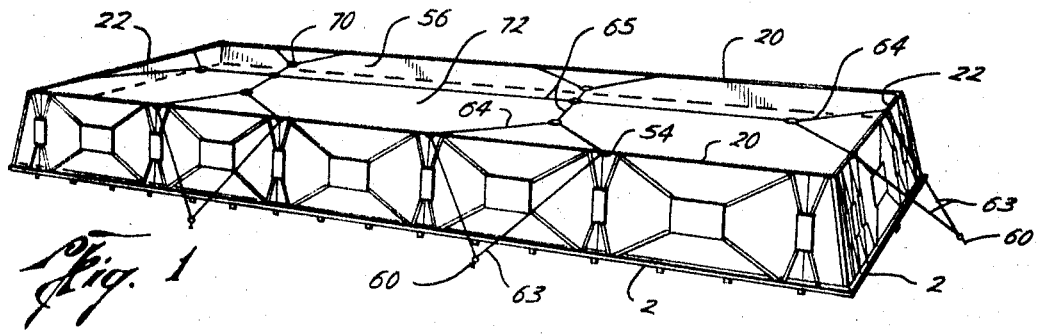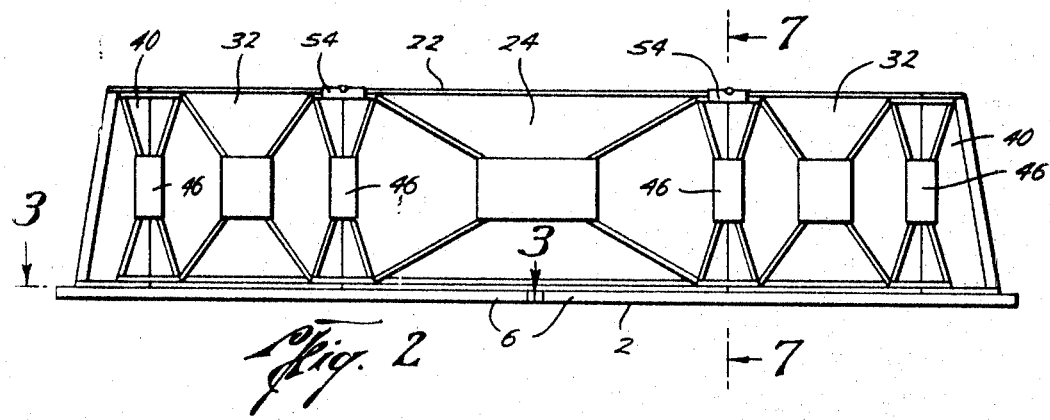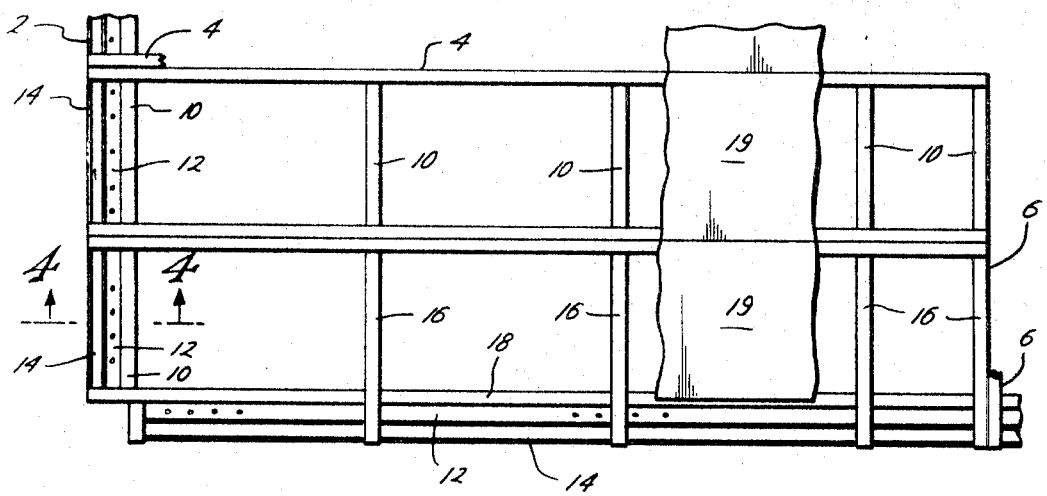

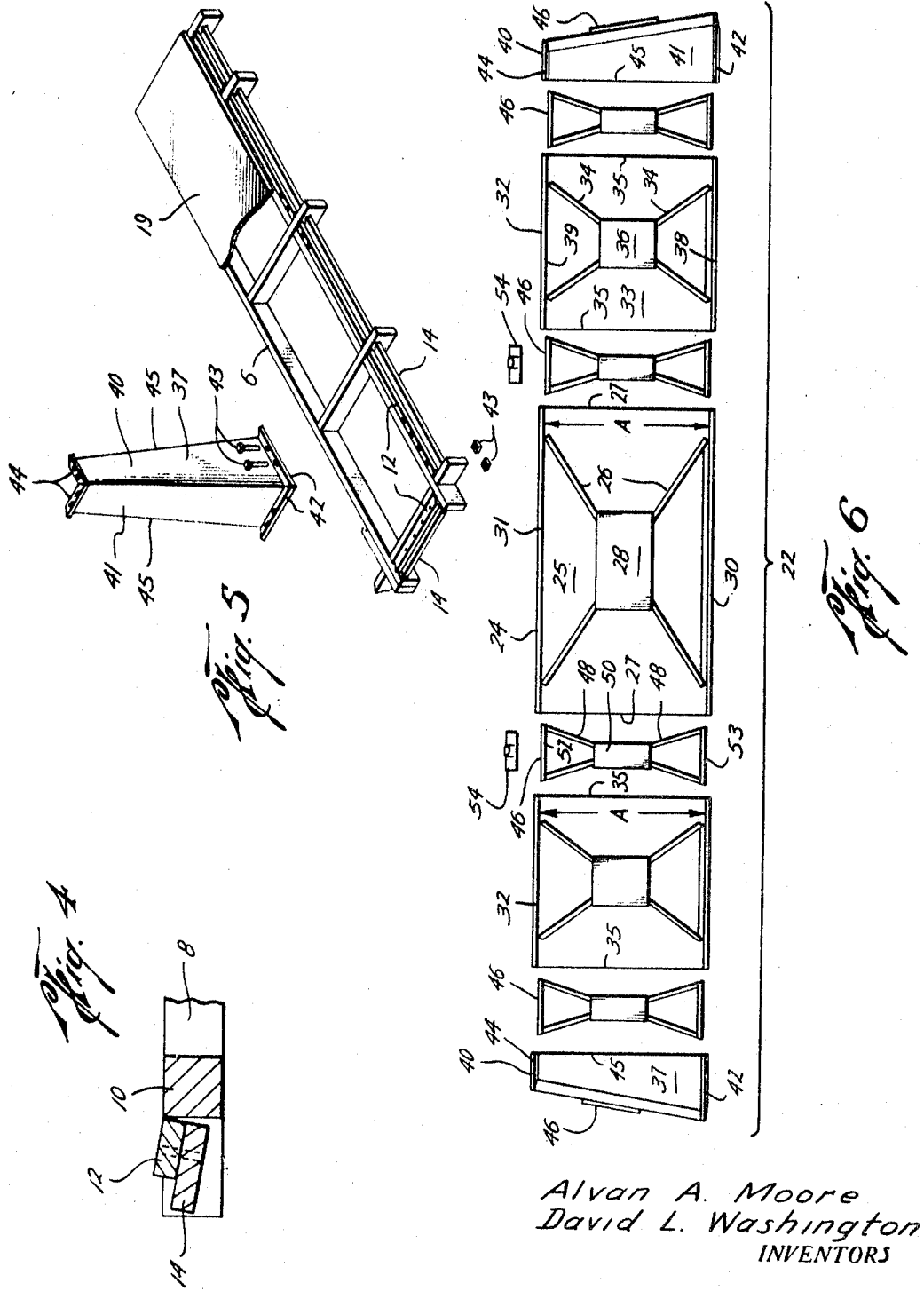

United States Patent Office 3,460,704
Patented Aug. 12, 1969

3,460,704
PORTABLE SURFACE-ERECTED STORAGE CONTAINER FOR LIQUID AND DRY MATERIALS
Alvan A. Moore, Corpus Christi, Tex. (Box 187, Encinal, Tex. 78019), and David L. Washington, 4502 Ocean Drive, Corpus Christi, Tex. 78412
Filed July 31, 1967, Ser. No. 657,179
Int. Cl. B65d 7/02, 57/00, 85/00
U.S. Cl. 220—5                          13 Claims

ABSTRACT OF THE DISCLOSURE

Portable, prefabricated apparatus having a modular base structure with an inwardly slanting mounting rail adjacent its outer periphery, side panels attached to the mounting rail and slanting inwardly to define an open-topped enclosure, a flexible liner suitable to contain liquid or dry materials, attached within the enclosure and supporting cables to hold the side panels in equilibrium regardless of the depth of materials contained within the lined enclosure.

Background of the invention

This invention relates to the storage of liquid or dry materials in a portable surface-erected container. The storage container structure is modular in design and has an inner flexible liner for containing liquid or dry materials.

The storage of salt water extracted in oil field operations has long been a problem. Saltwater from tank batteries used in separation of saltwater from crude oil is commonly pumped into open pits dug adjacent to the tanks. However, the use of open pits has several disadvantages. If the pit overflows or a surrounding embankment is breached, the saltwater contaminates the soil and destroys vegetation and crops. Often the same contamination is caused by the saltwater soaking into the pervious soil surrounding the pits.

One of the greatest disadvantages of open pit saltwater storage is the seepage of saltwater from the pit through sub-surface soil strata to contaminate underground fresh water sources. Souch sources are the principal fresh water supplies for human and animal consumption, and for crop irrigation. As the use of such open-pit storage tanks increase in number and density, the contamination of shallow sub-surface fresh water sources has shown an alarming increase. In view of the shortage of readily available fresh water supplies in many areas where such open-pits are utilized, saltwater contamination becomes a critical factor in further oil field operations in these and many other areas. Some state governments, in order to protect fresh water supplies have banned the use of open-pits for saltwater storage.

To remedy this situation other methods of storage are being utilized. One method is to line the open-pits with a covering of reinforced concrete to seal in the saltwater. However, the cost of such a structure is prohibitive to the oil field user, and the pit becomes a permanent structure, not salvageable, when it is no longer needed. Leaks through cracks in the concrete liner are extremely difficult to detect and repair and often detection is made only after sat-water contamination damage has already occurred.

Another container presently utilized is the steel tank. It too is a permanent structure, not salvageable, having an excessive initial cost and needing extensive maintenance because of the corrosive properties of the saltwater.

Solid plastic or fiber glass surface-erected tanks have been tried. Again, the cost is prohibitive for the size of storage tanks required in normal oil field use. The inherent structural problems involved in constructing plastic or fiber glass containers limits the size of container that can be built.

Another problem is the storage of large quantities of agricultural products on a temporary or seasonal basis. Farmers often have a need to store large bulk quantities of harvested non-perishable products such as a grain, corn, wheat, rice or cotton for short periods during the harvesting season until transportation, marketing or processing facilities are available. Similarly, ranches often have a need to store large bulk quantities of cattle feeds during certain seasonal periods.

Presently, there are no commercial portable containers for storage of large bulk agricultural products available. Often demands during harvesting will dictate that the temporary storage site be moved periodically to make more efficient use of transportation equipment and facilites. Large permanent structures are expensive to build and maintain and are not suitable for temporary use.

Summary of the invention

These disadvantages of the prior art are overcome with the present invention and novel portable, prefabricated surface-erected storage means are provided that can be erected and disassembled in relatively short periods of time, erected in various capacities because of its modular construction, and inexpensively installed and maintained.

Accordingly, one object of this invention is to provide a prefabricated storage container for liquid or dry materials having a modular base and side panel construction to facilitate the erection of storage containers in various sizes and capacities.

Another object of this invention is to provide a prefabricated, surface-erected storage container for liquid or dry materials having a wooden or metal frame work and a flexible liner suspended within the framework to contain the liquid or dry materials.

A further object of this invention is to provide a prefabricated, surface-erected storage container for liquid or dry materials having a modular base construction, rectangular side panels and brace sections fastened end-to-end and engaging the base to form a framework to support a bag-like liner capable of rapid assembly and disassembly without the necessity of specialized tools or equipment.

In a preferred embodiment of the present invention there is provided a modular wood-frame container structure having a seamless polyethylene liner covering the complete interior surface of the container. The container enclosure is formed by a floored base structure and laminated wood side panel assemblies attached to the periphery of the base. The liner is secured around the inside top rim of the enclosure formed by the side panel assemblies and is suspended loose inside of the enclosure. The container can be erected in various sizes or capacities as required because of its modular base and side panel design. The container is prefabricated and can be easily and rapidly erected without special tools or equipment.

The base structure of the storage container is formed of rectangular timbered base sections laid side by side to form a framed platform. The platform is then covered with an appropriate material to form a floored platform. Along at least one horizontal outer edge of each of the base sections is a slanted step member. When the base sections are positioned to form the base structure of the storage container, the horizontal slanted step members of adjoining base sections are aligned end-to-end to define an inwardly slanting supporting surface adjacent the periphery of the floored base structure for attachment of the side panel assemblies to the base.

The side panel assemblies are made up of laminated wood side panels reinforced and backed by integral cross braces, laminated wood corner braces and side braces.

The side panels and corner braces are bolted to the inwardly slanting base supporting surfaces. The side braces are utilized to laterally connect the side panels and corner braces together providing support and rigidity.

A wire cable support structure attached to the side panel assemblies insures equilibrium of the side panels regardless of the depth of the contents of the contained materials, and assures proper flexibility during expansion and contraction as the depth of the contents change.

All materials other than the liner are finished with a coating of epoxy for the prevention of corrosion and warping and to increase the fiber strength of the wood while making all of the materials fire resistant and to protect the wood from the effects of moisture.

Since the polyethylene liner is impervious to liquids and chemicals it is ideal for the storage of saltwater separated from petroleum products in oil field production. Such a container, however, would not be limited solely to use as a storage container of saltwater and other liquids as it could be used to temporarily store dry nonperishable agricultural products and other comminuted materials in large bulk quantities that cannot be stored directly on the ground exposed to the elements. For use with dry materials a covering or roof could be placed over the container to prevent the entrance of moisture.

Brief description of the drawings

In order that the manner in which the above cited objects and features of the invention are attained, as well as others which will become apparent, can be understood in detail, more particular description of the invention may be had by reference to the embodiments thereof which are illustrated in the appended drawings, which drawings form a part of this specification. It is to be noted, however, that the appended drawings illustrate only typical embodiments of the invention and therefore are not to be consideerd limiting of its scope, for the invention may admit to other equally effective embodiments.

FIGURE 1 is a pictorial view illustrating an installation of the preferred embodiment of the present invention.

FIGURE 2 is a side elevation of one of the side panel assemblies of the preferred embodiment shown in FIGURE 1.

FIGURE 3 is a partial top elevation showing the assembly of the base structure of the preferred embodiment taken along line 3—3 of FIGURE 2.

FIGURE 4 is a detailed cross-sectional view of the inwardly slanted rail members of each base section as taken along line 4—4 of FIGURE 3.

FIGURE 5 is a perspective exploded view illustrating the mounting orientation of a corner brace with respect to a base section.

FIGURE 6 is an exploded side elevation of a typical side panel assembly of the preferred embodiment.

FIGURE 7 is a detailed cross-sectional view of a typical side panel assembly taken along line 7—7 of FIGURE 2.

FIGURE 8 is a partial top elevation of an installed cable connector taken along line 8—8 of FIGURE 7.

Description of the preferred embodiments

Referring now to FIGURE 1, there may be seen a pictorial view of one embodiment of the present invention including a base structure 2 constructed on a level area, and side panel assemblies 20 and 22 removably attached to base structure 2 to form the side walls of the container enclosure. Side panel assemblies 20 and 22 can be constructed of a varying number of side panels to change the size and capacity of the storage container.

Around the inside top rim of the enclosure defined by side panel assemblies 20 and 22 is attached a seamless polyethylene liner 56. Liner 56 is suspended loose within the enclosure and conforms to the interior shape of the container enclosure when either liquid or dry materials are placed into the liner.

Anchors 60 and adjustable wire cable assemblies 63 are attached at selected intervals to the top rim of side panel assemblies 20 and 22 by means of cable connectors 54. Cable assemblies 63 are attached to anchors 60 and cable connectors 54 to provide upright support for the inwardly slanting side assemblies 20 and 22. Cable assemblies 64 and 65 are secured to centering rings 70 and cable connectors 54 to provide a stabilizing and support means to prevent outward arcuate movement of the top of the side panel assemblies 20 and 22 when the container is filled with either liquid or dry materials 72.

Side panel assembly 22 is shown in a side elevation in FIGURE 2. The bottom edge of side panel assembly 22 is attached to and supported by base sections 6 of base structure 2. Side panel assembly 22 is composed of rectangular side panels 24 and 32, corner braces 40 and side braces 46. Side braces 46 rigidly connect and support side panels 24 and 32 to lend rigidity to the side panel assemblies 20 and 22 and prevent excessive outward bulging when the container is filled. Side braces 46 are also used to connect corner braces 40 to side panels 32. Corner braces 40 provide a common support structure for the adjacent side panel assemblies 20 and 22.

Cable connectors 54 are removably secured to the top outer frame edges of adjacent side panels 24 and 32 and brace sections 46. When in place, cable connector 54 provides horizontal inwardly projecting and downwardly and outward U-shaped eyelets for attachment of the wire cables used to support and stabilize side panel assemblies 20 and 22.

Side panel assemblies 20 are similar in construction to side panel assemblies 22. Generally, side panel assemblies 20 will not contain shorter side panels 32 but will be made up of a varying number of side panels 24 and corner braces 40 coupled together by side braces 46 as previously discussed. By varying the size of base 2 and the length of side panel assemblies 20 and 22, storage containers of differing capacities may be erected.

FIGURE 3 shows the typical arrangement of the two types of base sections utilized in forming base structure 2. Interior base section 4 is constructed of timber joists 4 and 8 spaced apart by timber transverse braces 10. One end of base section 4, which will form the outer edge of base 2, has a horizontally disposed inwardly slanting rail section 12 supported by slanted brace member 14. Base sections 4 are laid adjacent each other and the ends having slanted rail section 12 are aligned to form an almost continuous rail member adjacent one edge of assembled base sections 4. To form a rail supporting surface on the opposite side of base 2, interior base sections are reversed and assembled so that the edge having slanted rail section 12 is to the outside opposite the other side of base 2.

End base sections 7 are similar in construction to interior base sections 4, having timber joists 8 and 18 and timber transverse braces 10 and 16. The primary difference between the two types of base sections is that end base section 6 has a slanted rail section 12 along two sides to provide the necessary mounting surface for side wall assemblies 22 and corner braces 40. As seen in FIGURE 2, two end base sections 6 laid end-to-end provide the slanted rail supporting surface necessary for side wall assembly 22. Side panel assembly 20 is supported by and attached to a required number of interior base sections 4 utilizing a portion of end base section 6 to tie with corner brace 40.

A cross-sectional view of slanted rail section 12 is shown in FIGURE 4 taken along line 4—4 of FIGURE 3. Joist 8 is shown with the top edge of rail section 12 abutting transverse brace 10. Slanted brace member 14 provides a mounting sill for rail section 12 and provides added load bearing support when side panel assemblies 20 and 22 are in place. The cross-section detail of slanted rail section 12, when a part of end base section 6 or interior base section 4, is identical.

Joists 8 and 18 of base sections 14 and 6 are typically constructed of 4″ x 4″ timber, while transverse braces 10 and 16 are typically constructed of 2″ x 4″ timber. Rail member 12 and brace member 14 are typically constructed of 2″ x 4″ and 2″ x 6″ timber, respectively. Flooring 19 can be of any suitable flooring material and is typically ¾″ plywood. Lightweight structural metals would be ideally suited for the framing of the base sections. Lightweight corrosion resistant metal panels could be used in lieu of the laminated wood flooring. Of course, any other suitable structural material may be used.

FIGURE 5 is a perspective exploded view showing the mounting relation of corner section 40 to end base section 6. Corner brace 40 has two upright inwardly slanting sides 37 and 41. Each side has a mounting bracket 42 and a top rim 44. Mounting brackets 42 are removably attached to slanted rail sections 12 by means of bolts 43. Similarly, side panels 24 and 32 are removably secured to rail sections 12 of base sections 4 and 6.

Side panel assembly 22 is shown disassembled in FIGURE 6. Rectangular side panel 24 is constructed of a laminated wood panel 25 backed by timber cross-braces 26 and a laminated wood reinforcing panel 28 attached to cross-braces 26 at their intersection. Mounting bracket 30 is fixed to the lower edge of panel 25 and is drilled to accept bolts for removably fastening side panel 24 to slanted rail section 12. An upper bracket 31 is fixed to the upper edge of panel 25 to form the top rim of side panel 24.

Side panel 32 is similarly constructed although of a shorter length. Laminated wood panel 33 is backed by timber cross-braces 34 and a laminated wood reinforcing panel 36. Mounting bracket 38 is fixed to the bottom edge of panel 33 to removably fasten side panel 32 to base w. Upper bracket 39 provides a top rim for side panel 32.

Side braces 46 are constructed of timber cross-members 48, and a reinforcing panel 50 of laminated wood fixed to cross-members 48 at their intersection. Braces 52 and 53 are horizontally attached to the top and bottom extremities of cross-members 48 to provide a rigid support and to provide brackets for attachment to side panels 24 and 32.

When side panels 24 and 32 are attached to base structure 2, edges 27 and 35 of side panels 24 and 32, respectively, are abutting with no vertical support. Side brace section 46 provides such vertical support and rigidly connects the abutting edges of the side panels 24 and 32 and corner braces 40 together.

The overall height of side brace 46 from the bottom of lower brace 53 to the top of upper brace 52 is the same as the interval between top and bottom brackets 30 and 31, and 38 and 39 of side panels 24 and 32, respectively, shown as dimension A in FIGURE 6. Side brace 46 abuts the upper and lower ends of cross-braces 26 and 34 of side panels 24 and 32, respectively, and is centered over the seam between edges 27 and 35 of panels 24 and 32. Side brace 46 is removably attached to side panels 24 and 32 by bolts through braces 52 and 53 and the adjacent ends of brackets 30 and 31 and 38 and 39 of side panels 24 and 32, respectively.

Similarly, side brace 46 connects the supported abutting ends, 35 and 45, of side panel 32 and corner brace 40, respectively, to provide rigidity and support. Side brace 46 is held in place by bolts through braces 52 and 53 and the adjacent ends of brackets 42 and 44 and 38 and 39 of corner brace 40 and side panel 32, respectively. Side panel assembly 20 is similarly constructed of side panels 24 and 32, corner braces 40 and side braces 46.

Panels 25 and 33 of side panels 24 and 32, respectively, and reinforcing panels 28, 36 and 50 of side panels 24 and 32 and side braces 46 are typically constructed of ¾″ laminated wood. All cross-braces and brackets of side panels 24 and 32, side braces 46 and corner braces 40 are typically 2″ x 4″ timber. Of course, any other suitable structural materials, such as lightweight structural metals, may be substituted without departing from the invention herein disclosed.

In the preferred embodiment, side panel 24 is typically six feet high and twelve feet long, while side panel 32 is typically six feet high and six feet long. Sides 37 and 41 of corner braces 40 are typically two feet wide at the base and one foot wide at the top edge. When fully assembled for a 3,000 barrel capacity, container, the outside dimension of base 2 is 90 x 28 feet, and the sides stand approximately six feet high. However, the sizes indicated are illustrative of the preferred embodiment only and may be of any other convenient size.

Cable connector 54 has a steel angle bracket, one side of which slides under the bottom of upper brace 52 of side brace 46 and is fastened thereto by the same bolts that removably attach upper brace 52 of brace 46 to side panels 24 and 32 and corner braces 40.

FIGURE 7 is a detailed cross-sectional view of side panel assembly 22 taken along line 7—7 of FIGURE 2. End base section 6 is shown in place abutting an interior base section 4. Laminated wood flooring 19 is shown in place over base sections 4 and 6. Side panel 24 is shown in place with its mounting bracket 30 attached to inwardly slanted rail section 12, which is in turn supported by slanted brace member 14. Side brace 46 is shown with lower bracket 53 removably attached to mounting bracket 30, rail section 12 and brace member 14 by means of bolt and nut 16.

Cable connector 54 (FIGURES 7 and 8) is constructed with a horizontal inwardly projecting U-shaped eyelet 57 and an outwardly and downwardly projecting U-shaped eyelet 51 welded to a steel angle member 55. The lower face of angle member 55 slides under the bottom of upper brace 52 of side brace 46, and the upright face abuts the back of brace 52 and upper bracket 31 of side panel 24. Upper bracket 31, brace 52 and cable 54 are secured together by bolts 60.

Polyethylene liner 56 is attached around the inside top edge of side panel assemblies 20 and 22 by a narrow retaining strip 58 and nails 59. The liner is a seamless polyethylene sheet loosely suspended within the enclosure and conforms to the shape of the enclosure formed by inwardly slanting side panel assemblies 20 and 22 and floor 19 of base 2 when materials 72 are placed inside.

Buried at preselected intervals around the perimeter of base 2 and spaced from it a selected distance are concrete anchors 60. Anchors 60 are made up of an anchor ring 67 embedded in a concrete base 62. Cable 63 is looped through anchor ring 67 and held by clamp 68. The other end of cable 63 is attached to one end of adjustable turnbuckle 66, the other end of which is attached to U-shaped eyelet 51 of cable connector 54.

As can be seen in FIGURES 1 and 7, cables 63 from adjacent pairs of cable connectors 54 are connected to anchors 60. This combination of anchors 60, cables 64 and cable connectors 54 acts as a supporting means for side wall assemblies 20 and 22. The unsupported weight of the inwardly slanting side walls would cause the center of side wall assemblies 20 and 22 to sag inwardly, thus the first supporting means just described would retain side wall assemblies 20 and 22 in the proper upright and inwardly slanting attitude.

Cable 64 (FIGURE 7) is looped through one eyelet of an adjustable turnbuckle 66 and held by clamp 68. The other end of turnbuckle 66 is attached to inwardly projecting U-shaped eyelet 57 of cable connector 54. The other end of cable 64 is attached to centering ring 70. A cable 64 from an adjacent turnbuckle 66 and cable connector 54 is shown attached to centering ring 70. The other end of cable 65, shown attached to centering ring 70 in FIGURE 7, would be attached to another centering ring 70 receiving other cables 65 as illustrated in FIGURE 1. Of course, if the enclosure is small, only one centering ring may be utilized.

When the liner is filled with material 72 the outward pressure exerted by the contained material on side wall assemblies 20 and 22 causes the top of the side walls to pivot arcuately outward about the slanted rail section 12 of base 2. In addition, side wall assemblies 20 and 22 will bulge laterally outward in the center from the pressure of the contained materials. The combination of cable connectors 54, cables 64 and 65, and centering rings 70, as shown in FIGURES 1 and 7, provide a second supporting means to oppose the tendency of the side wall to move arcuately outward around their lower edge and to prevent the outward bulging of the side walls under pressure. The second supporting means maintain the side wall in their upwardly and inwardly slanted position under sideward pressure from the contained materials. Cooperating with the rail member formed by rail sections 12, and the first supporting means, the restraining means provide a stabilization of side wall assemblies 20 and 22 while the storage container is empty, partially filled, or filled to capacity.

While the container is empty, cables 63, 64, and 65 are initially adjusted to remove any slack in the cables. Then each cable is adjusted so that the side panel assemblies 20 and 22 are in equilibrium and there is sufficient tension in all cables to retain side panel assemblies 20 and 22 in the desired upwardly and inwardly slanted position without inwardly sagging due to the weight of the long unsupported sides.

The inward slant of side panel assemblies 20 and 22 with relation to base 2 is shown in FIGURE 7. As previously described, the inwardly slanting attitude of side panel assemblies 20 and 22 is maintained by the cooperation of rail sections 12 and the first and second cable supporting means. This action reduces the shear forces acting against bolts 61 fastening side panel assemblies 20 and 22 to base structure 2 and increases the downward compression forces through side panel assemblies 20 and 22 against rail sections 12. In addition, the component of side pressure normal to the interior surface of side wall assemblies 20 and 22 is reduced.

Typically during 24 hour continuous operation, a 3,000 barrel storage container for saltwater will probably not exceed 40 percent of container capacity. However, the preferred embodiment shown has a safety factor of 3 even when filled to capacity.

The cross-section detail of side panel assembly 20 is identical to that shown in FIGURE 7 and will not be discussed.

A partial top view of cable connector 54 is shown in FIGURE 8. Eyelets 51 and 57 are shown welded to the upright side of angle bracket 55. The horizontal side of angle bracket 55 slides under the bottom of upper brace 52 of side braces 46 as shown in FIGURES 7 and 8. Cable connector 54 is removably attached to upper brace 52 and upper bracket 31 of side panel 32 by bolt 60.

Numerous variations and modifications may obviously be made in the structures herein described without departing from the present invention. Accordingly, it should be clearly understood that the forms of the invention described herein and shown in the figures of the accompanying drawings are illustrative only, and are not intended to limit the scope of the invention.

What is claimed is:

1. A prefabricated surface-erected storage apparatus for holding liquid or dry comminuted materials, said storage apparatus comprising:
    a base,
    a rail member adjacent the periphery of said base for defining a substantially continuous supporting surface,
    a wall erected about the edge of said base and removably attached to said rail member for forming an enclosure,
    a flexible liner disposed within said enclosure formed by said base and wall for containing the materials,
    first supporting means for opposing inward arcuate movement of said wall toward said base, and
    second supporting means for opposing outward arcuate movement of said wall away from said base.

2. The storage apparatus described in claim 1, wherein said second supporting means cooperates with said first supporting means and said rail member for reducing the side pressure component normal to said wall and increases the compression force component downward through said wall when said liner contains a substantial amount of the materials.

3. The storage apparatus described in claim 2, wherein said wall means forms an open-topped enclosure having a substantially flat-surfaced interior.

4. The storage apparatus described in claim 3, wherein said first supporting means comprises:
    a plurality of cable connectors disposed at spaced intervals about the top edge of said wall and each having first and second eyelets,
    a plurality of anchor members disposed at spaced intervals about said base, and
    a first plurality of adjustable cables each detachably and tautly connected between one of said anchors and said first eyelet of the cable connector nearest thereto.

5. The storage apparatus described in claim 4, wherein said second supporting means comprises:
    at least one ring member disposed above the liner,
    a second plurality of adjustable cables each detachably and tautly interconnected between said ring member and the second eyelet of a different respective one of said cable connectors.

6. The storage apparatus described in claim 5, wherein said wall includes a plurality of flat rigid panels of predetermined sizes abuttingly spaced about said base and removably attached to said rail member.

7. The storage apparatus described in claim 6, wherein said base comprises a plurality of rigid base sections of predetermined sizes abuttingly arranged for defining a substantially level platform.

8. The storage apparatus described in claim 6, wherein said wall further includes brace members for providing lateral connection and support for said panels and rigid corner support for said wall.

9. The storage apparatus described in claim 8, wherein said brace members comprise:
    a plurality of inwardly tilted rigid corner braces removably attached to said rail member adjacent each corner of said base with the edges of said corner brace abutting the edges of said panels on adjacent sides of said base for providing rigid corner support for said wall, and
    a plurality of side braces each removably connected across the abutting edges of said panels and corner braces for providing lateral connection and support.

10. A prefabricated and surface-erected storage apparatus for holding liquid or dry comminuted materials, said storage apparatus comprising:
    a base member composed of a plurality of rigid base sections of predetermined sizes abuttingly arranged for defining a substantially level platform,
    an inwardly slanting rail member adjacent the periphery of said base member for defining a substantially continuous supporting surface,
    an open-topped flat-sided enclosure composed of a plurality of flat rigid panel members of predetermined sizes spaced about said base member and removably attached to said rail member,
    a plurality of inwardly tilted rigid corner braces removably attached to said rail member adjacent each corner of said base member with the edges of said corner braces abutting the edges of said panel members on adjacent sides of said base member for providing rigid corner support for said enclosure,
    a plurality of side braces each removably connected across the abutting edges of said panel members and corner braces for providing lateral connection and support,
a flexible liner member disposed within said enclosure and formed by said base member and said enclosure into a bag-like container,
a plurality of cable connectors disposed at spaced intervals about the top edge of said enclosure and each having first and second eyelets,
a first supporting means including a plurality of anchor members disposed at spaced intervals about said base member and a first plurality of adjustable cables each detachably and tautly connected between one of said anchors and said first eyelet of the cable connector nearest thereto for opposing inward arcuate movement of said enclosure toward said base member, and
a second supporting means including at least one ring member disposed above the liner member and a second plurality of adjustable cables each detachably tautly interconnected between said ring member and the second eyelet of a different respective one of said cable connectors for opposing outward arcuate movement of said enclosure away from said base member and cooperating with said first supporting means and said rail member to reduce the side pressure component normal to said panel members and increase the compression force component downward through said panels against said rail member when said bag-like container contains a substantial amount of the materials.

11. The storage apparatus described in claim 10, wherein said cable connector comprises:

an L-shaped metal section adapted for bolt attachment to the top edge of said enclosure,
a first metal eyelet fixed to said metal section and extending downwardly and rearwardly of the upright portion of said L-shaped metal section, and
a second metal eyelet fixed to said metal section and extending forwardly and upwardly of the upright portion of said L-shaped metal section.

12. The storage apparatus described in claim 10, wherein said flexible liner comprises a thin polyethylene sheet disposed within said enclosure and attached around the inside top rim of said enclosure and supported by said panel members and said base member for containing the liquid or dry comminuted materials.

13. The storage apparatus described in claim 10, wherein said rail member comprises a plurality of inwardly slanted rail sections at least one of which is attached to at least one edge of said base sections for defining a substantially continuous supporting surface adjacent the periphery of said abutting formation of base sections.

References Cited

UNITED STATES PATENTS

| | | |
|---|---|---|
| 730,344 | 6/1903 | Clayton. |
| 2,490,272 | 12/1949 | Kuscle _____ 220—50 X |
| 3,317,926 | 5/1967 | Hall _____ 4—172 |
| 3,335,430 | 8/1967 | Schwartz _____ 220—71 X |

GEORGE E. LOWRANCE, Primary Examiner

U.S. Cl. X.R.
4—172; 220—71

UNITED STATES PATENT OFFICE
CERTIFICATE OF CORRECTION

Patent No. 3,460,704                                August 12, 196

Alvan A. Moore et al.

It is certified that error appears in the above identified patent and that said Letters Patent are hereby corrected as shown below:

Column 2, line 16, "facilites." should read -- facilities.
Column 5, line 62, "supported" should read -- unsupported
Column 6, line 37, after "cable" insert -- connector --.

Signed and sealed this 5th day of May 1970.

(SEAL)

Attest:

Edward M. Fletcher, Jr.                      WILLIAM E. SCHUYLER, JR.

Attesting Officer                                 Commissioner of Patents